Patented Nov. 20, 1934

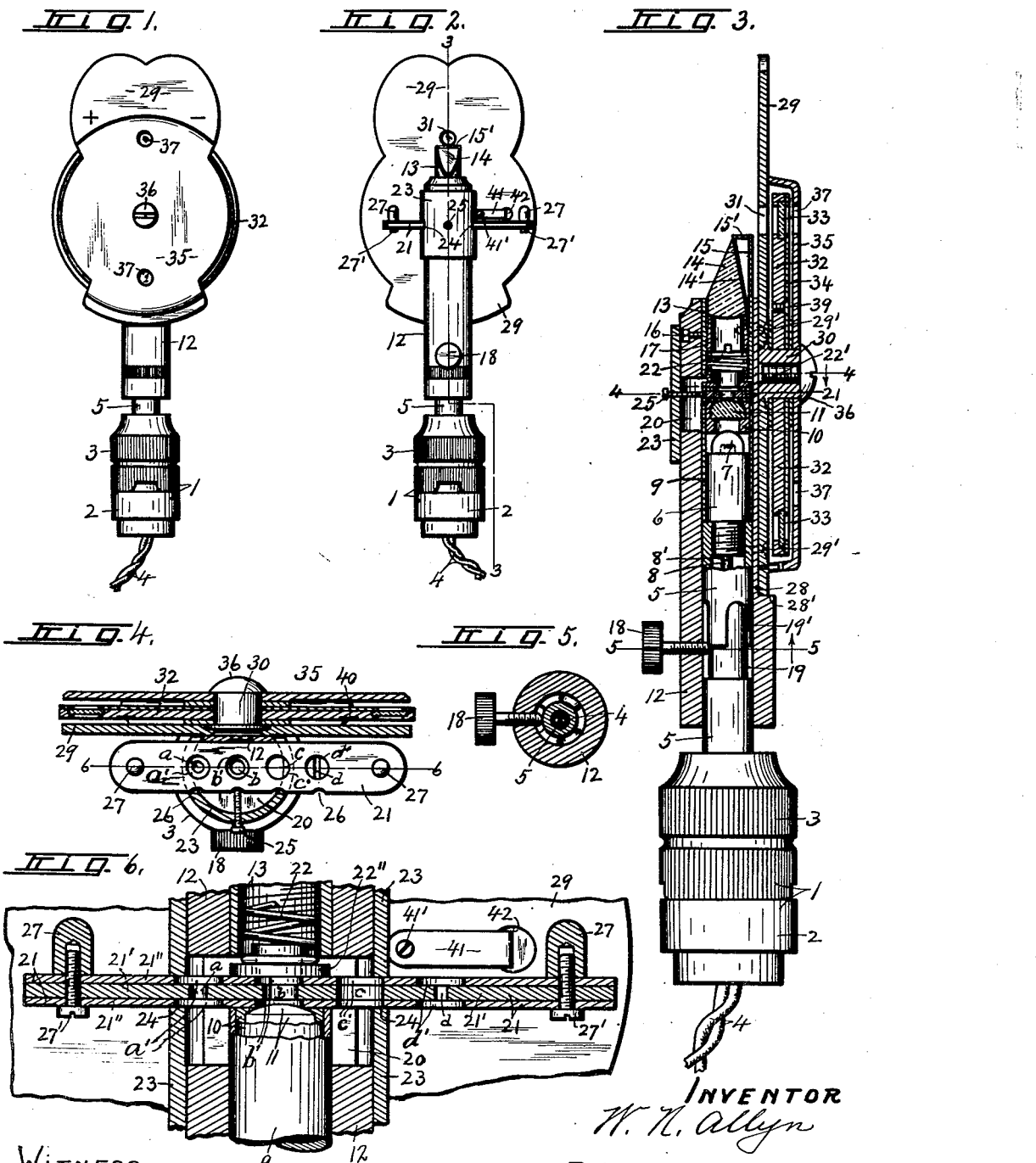

1,981,214

UNITED STATES PATENT OFFICE 1,981,214

OPHTHALMOSCOPE

William N. Allyn, Auburn, N. Y.

Application July 18, 1932, Serial No. 623,149

12 Claims. (Cl. 88—20)

This invention relates to an opthalmoscope or analogous instrument in which a source of light and a projecting lens are arranged in axially spaced coaxial relation for projecting the rays of light forwardly from and at substantially right angles to the axis of the lamp and lens in combination with a plate at the back of the lens having a sight opening through which the projected rays of light are visible, and a rotary disk carrying a circular row of lenses of different dioptrics adapted to be individually registered with the sight opening according to the power required.

In devices of this character, the source of light usually consists of a small incandescent, but powerful, electric lamp to which current may be supplied from any available source, such, for example, as a battery handle, while the projecting lens is preferably prismatic and provided with a vertically inclined rear surface to which is applied an opaque coating to render the surface reflective for reflecting the rays of light forwardly through the prism.

It is desirable in instruments of this character to employ a diaphragm movable across the axis of and between the lamp and lens and provided with series of apertures of different size or form any one of which may be brought into registration with said axis for restricting the light rays from the lamp to the lens and, in view of the fact that the lamp and lens are relatively adjustable axially, to properly focus the rays of light through the lens.

It is highly important that the axial distance relation between the diaphragm and source of light or lamp shall remain constant.

One of the objects, therefore, of the present invention is to provide simple and efficient means for maintaining this constant axial distance relation between the diaphragm and lamp in all relative positions of axial adjustment between the lamp and lens.

Another object is to provide simple means for yieldingly holding the diaphragm in any position of adjustment.

Another object is to provide the instrument with a condenser lens interposed between the lamp and diaphragm in coaxial relation to the lamp and projecting lens and in constant axial distance relation to the lamp and at the same time to utilize the convex outer surface of the condenser lens in cooperation with the diaphragm for frictionally holding the latter in its different positions of adjustment.

Another object is to provide means whereby the lamp and lenses may be relatively adjusted angularly about the axis thereof to correct aberrations in the transmission of the light through the lenses.

Other objects and uses relating to specific parts of the instrument will be brought out in the following description.

In the drawing:—

Figures 1 and 2 are opposite face views of an ophthalmoscope embodying the various features of my invention.

Figure 3 is an enlarged vertical sectional view taken on line 3—3, Figure 2.

Figures 4 and 5 are transverse sectional views taken respectively along lines 4—4 and 5—5, Figure 3.

Figure 6 is a further enlarged vertical sectional view through the diaphragm and adjacent portions of the instrument.

As illustrated, the instrument comprises a coupling 1 similar to that set forth in my Patent No. 1,516,133 dated November 18th, 1924, in that it includes coaxial sections 2 and 3 detachably coupled to each other by a bayonet lock joint, the section 2 being adapted to be secured to a battery handle or equivalent supporting means through which suitable electric conductors 4 may be passed for supplying current to the lamp, presently described.

The coupling section 3 is provided with a lamp supporting spindle 5 having its outer end threaded internally for receiving the threaded end of a lamp socket 6 carrying at its outer end an incandescent electric lamp 7, whereby the spindle 5 and socket 6 serve as a holder for the lamp as shown more clearly in Figure 3.

The conductors 4 may be connected in any suitable manner to the lamp 7, the electric connections including contacting terminals 8 and 8', one of which as 8 is adapted to yield axially when the lamp socket 6 is secured in place.

The lamp socket 6 and its lamp 7 are surrounded by a metal guard sleeve 9 which is removable endwise from the lamp socket but normally has its inner end resting against the outer end of the spindle 5 and its outer end extended beyond the lamp 7 for receiving and supporting a lens holder 10 in which is secured a condenser lens 11, the holder 10 being tightly secured in the outer end of the guard sleeve 9 while the lens 11 is permanently secured in the holder.

This lens is provided with an outer convex face projecting slightly beyond the corresponding end face of the guard sleeve 9 for frictional engagement with a diaphragm in a manner hereinafter described, see Figure 6.

A tubular head 12 is telescopically mounted upon the periphery of the spindle 5 to extend outwardly therefrom some distance beyond the lamp 7 and condenser lens 11 for axial adjustment relatively to said lamp and lens and carries in its outer end a tubular sleeve 13 for receiving and supporting a projecting lens 14 which extends outwardly some distance beyond the corresponding end of the head so that the head 12 and sleeve 13 become in effect a holder for the lens 14.

The rear side of the sleeve 13 is provided with an outwardly extending arm 15 having a forwardly projecting terminal end 15' engaging the outer end of the lens 14 to hold the latter in the sleeve 13 against outward axial displacement.

The lens 14 is preferably of the prismatic type having its front and rear faces converging outwardly, the rear face being provided with an opaque coating 14' cooperating with the lens to form a mirror whereby the rays of light from the lamp entering the lens 14 will be reflected forwardly, see Figure 3.

The sleeve 13 is held in place by releasable means consisting in this instance of a set screw 16 engaged in a threaded socket in the peripheral wall of the adjacent portion of the head 12 so that when released the sleeve 13 with the lens 14 thereon may be removed by outward axial displacement, see Figure 3.

The sleeve 13 is preferably threaded internally for receiving a tubular nut 17 which is adjustable axially and engages the inner end of the lens 14 to firmly hold said lens in operative position with its outer end engaging the shoulder 15'.

When the sleeve 13 with the lens 14 thereon is removed from the head 12, the nut 17 may be loosened to permit the removal of the lens by forward displacement from engagement with the shoulder 15'.

It will be observed from the foregoing description that the spindle 5 constitutes a holder for the lamp 7 and incidentally serves as a support for the guard sleeve 9 and condenser lens 11 through the medium of the lens supporting member 10 and it, therefore, follows that when the lamp 7 and supporting sleeve 9 for the condenser lens are mounted upon the spindle they will be maintained in constant axial distance relation in all positions of axial adjustment of the head 12 and projecting lens 14 mounted thereon.

As previously stated, the head 12 is adjustable lengthwise of and upon the spindle 5 and is held in different positions of adjustment by releasable means, such as a set screw 18, as shown more clearly in Figure 3.

The head 12 is also adjustable angularly about the axis of the spindle and for this purpose the spindle is provided with an annular groove 19 and lengthwise peripheral slots 19' extending outwardly from the groove for receiving the inner end of the set screw 18.

That is, by slightly loosening the set screw 18 the head 12 may be moved inwardly until the inner end of the set screw registers with the groove 19, thus permitting the head 12 and spindle 5 to be turned relatively to each other as may be necessary at times to correct imperfections in the transmission of light through the lenses after which the head 12 and spindle 5 may be relatively adjusted axially to bring the projecting lens and lamp into proper focal relation without disturbing the axial distance relation between the lamp 7 and condenser lens 11 and slide 21.

When the head 12 and spindle 5 have been relatively adjusted axially to establish the proper focal relation between the lamp 7 and projector lens 14, the head and spindle may be secured to each other by tightening the set screw 18.

It will be evident from the foregoing description that when the set screw is sufficiently loosened, the head 12 and spindle 5 may be removed one from the other by axial displacement.

*Diaphragm*

The front portion of the tubular head 12 between the lamp 7 and sleeve 13 is cut away to form a vertically elongated slot or opening 20 for receiving the intermediate portion of a transversely movable slide or diaphragm 21 and thus permitting the limited axial adjustment of the head 12 and spindle 5 relatively to each other without affecting the axial distance relation between the diaphragm and lamp or between the diaphragm and lens 11, see Figures 3, 4 and 6.

In other words, the diaphragm 21 is slidable endwise diametrically across the axis of the tubular head 12 for sequentially registering its apertures with said axis and is yieldingly held against the outer end of the sleeve 9 and convex face of the lens 11 by means of a coil spring 22 which is enclosed within the supporting sleeve 13 for the prismatic lens 14 and has its outer end bearing against the inner end of the tubular nut 17 and its inner end engaged with a bearing ring 22', the latter being engaged with the outer face of the diaphragm 21, as shown more clearly in Figures 3 and 6, thereby maintaining a definite axial distance relation between the lamp 7 and slide 10.

The tubular head 12 is mainly cylindrical while the slot or opening 20 extends from the front face rearwardly beyond the axis thereof or to the rear edge of the diaphragm 21 where it continues across the slot to form a guide for the rear edge of the diaphragm.

As shown more clearly in Figures 4 and 6, this diaphragm is of considerably greater length from end to end than the diameter of the head 12 so as to extend some distance beyond opposite sides of said head and its intermediate portion is provided with a series of, in this instance four, light openings $a$, $b$, $c$ and $d$, the openings $a$, $b$ and $c$ being circular and of gradually increasing diameter from one end toward the opposite end of the diaphragm while the opening $d$ is preferably elongated transversely of the bar and is relatively narrow lengthwise of the bar so as to form what may be termed a slit.

Each of these openings is adapted to be registered with the axis of the tubular head 12 as the diaphragm is moved endwise to different positions for permitting the rays of light from the lamp 7 to pass therethrough to the projecting lens 14 where they are reflected forwardly through the portion of the lens above the upper end of the head 12.

As shown more clearly in Figure 6, the diaphragm 21 is of laminated construction in that it comprises a central lengthwise bar 21' and opposite relatively thin flat bars 21" spot welded or otherwise permanently secured to the opposite faces of the central bar 21'.

These flat bars 21" are provided with a series of, in this instance four, circular openings $a'$, $b'$, $c'$ and $d'$ of equal diameter greater than and registering with the corresponding openings $a$, $b$, $c$ and $d$ in the central bar 21', the openings in the lower flat bar 21″ being of less diameter than that of the lens 11 so as to receive the central portion of the convex end of the lens when registered therewith.

That is, the diaphragm is slidable across and in contact with the upper end of the sleeve 9 and against the convex face of the lens 11 and is yieldingly held in contact with the upper end of the sleeve by the spring 22 so that when the diaphragm is moved endwise its lower face will ride against the outer convex face of the lens 11, thereby slightly compressing the spring 22 until one or the other of the openings a', b', c' and d', in this instance b' in the lower plate 21″ is registered with the lens which cooperates with the adjacent openings as b' to properly center the registering opening in the diaphragm with said lens.

A split spring band 23 is slidable lengthwise of and upon the periphery of the upper portion of the tubular head 12 and is provided with diametrically opposite guide slots 24 for receiving and guiding the diaphragm 21 as the latter is moved endwise across the axis of the tubular head, said band serving also to cover the elongated opening 20.

This band is preferably made of thin spring steel to extend around the front and opposite sides of the tubular head 12 and is provided in its front side with a threaded opening for receiving a screw 25 which extends into the opening 20 and is adapted to engage in one or the other of a series of notches 26 in the front edge of the diaphragm for frictionally holding the latter in its adjusted position with one or the other of the apertures a, b, c or d registering with the axis of the tubular head, see Figs. 3 and 4.

Suitable finger pieces or handles 27 are secured by releasable means such as screws 27' to the opposite ends of the diaphragm to project upwardly therefrom for convenience of operation of said diaphragm, as shown more clearly in Figures 2, 4 and 6.

It will be noted upon reference to Figure 4 that the opposite ends of the split band 23 terminate just at the rear of the diaphragm 21 which allows a limited spring action of the front portion of the band forwardly as the diaphragm 21 is moved endwise against the inner end of the screw 25 thereby forming additional friction means for holding the diaphragm in its adjusted position.

The rear side of the upper portion of the tubular head 12 is cut away and flattened at 28 to form a suitable support for a flat plate 29 which is secured to the flat rear face of the tubular head 12 by any suitable releasable means consisting in this instance of screws 29' shown by dotted lines in Figure 3, said plate 29 having its lower edge resting upon a shoulder 28' at the lower end of the recess 28.

This plate 29 is provided with a rearwardly extending hub 30 in a plane between the lamp 7 and prismatic lens 14, said plate being provided with a sight opening 31 just above the upper end of the lens 14, as shown in Figure 3.

In other words, the sight opening 31 and upper end of the lens 14 are approximately equal distances from the axis of the hub 30 to enable the operator to visualize the object upon which the rays of light are projected forwardly from the lens 14.

Upon this hub 30 is journaled a circular disk 32 having a circular row of openings a distance from the axis of the hub 30 corresponding to the distance of the sight openings 31 from said axis for receiving a corresponding number of lenses 33 of different dioptrics as may be required to visualize objects through the sight opening 31 at different distances from the lens 14, said disk 32 being provided at its rear face with a dial 34 bearing numerals indicating plus or minus dioptric values.

One or more of the lenses 33 may be omitted, if desired, to afford a clear sight opening or openings.

A guard plate 35 is mounted upon the outer end of the hub 30 to cover the rear surface of the dial plate 34 and its lower and upper ends are extended across the periphery of the disk 32 to bear against the rear face of the plate 29 as shown in Figure 3, said guard plate and disk being held against axial displacement from the hub by means of a cap screw 36 which is engaged in a threaded socket in the hub, see Figures 1, 3 and 4.

This guard plate is provided with sight openings 37 registering with the numbers on the dial plate 34 to enable the operator to determine the dioptric value of the lens 33 which may be registered with the sight opening 31, said dial plate 34 being secured to the rear face of the disk 32 by one or more screws 39 or equivalent releasable means, see Figure 3.

Suitable means is provided for frictionally holding the disk 32 in different positions of adjustment and for this purpose the rear face of the disk 32 is provided with a circular row of notches 40, one for each of the lenses 33, and each adapted to be engaged by a spring pawl 41 having one end secured by a screw 41' to the plate 29 and its other end movable in an aperture 42 in said plate and into engagement with any one of the notches 40 which may be registered with the opening 42, see Figures 2 and 6.

*Operation*

The current for the lamp 7 may be controlled by any suitable switch through the medium of a rheostat, if desired, and when it is desired to use the ophthalmoscope, the switch will be closed, thereby energizing the lamp 7 and causing the rays of light to be projected therefrom through the condenser lens and thence through the registering aperture in the diaphragm 21 and upwardly through the prismatic lens 14 to be reflected and projected forwardly therefrom.

Under these conditions, the lens carrying disk 32 may be adjusted to bring the proper lens into registration with the sight openings 31 and 37 through which the operator may readily visualize the object upon which the rays of light are projected from the lens 14.

When desired, the diaphragm 21 may be adjusted endwise to bring any one of its apertures into registration with the beam of light from the lamp 7, during which operation the diaphragm will be yieldingly held against the outer convex surface of the lens 11 and its supporting sleeve 9, thus maintaining constant axial distance relation between the diaphragm and lamp and also between the diaphragm and condenser lens 11 irrespective of the axial distance between the lamp and prismatic lens 14.

That is, the lamp supporting spindle 5 and the supporting head for the outer lens 14 may be adjusted axially relatively to each other with the assurance that the diaphragm 21 will be maintained in constant axial distance relation to the lamp and to the condenser lens 11.

During this endwise adjustment of the diaphragm the engagement of its rear notched edge with the adjacent end of the screw 25 will cause a slight outward springing movement of the split band 23 which reacts upon the screw when one of the notches is registered therewith to frictionally hold the diaphragm in its adjusted position.

It will also be observed that when the diaphragm is moved endwise to register any one of its apertures with the axis of the tubular head 9, it will ride across the convex face of the lens 11, thereby slightly moving the diaphragm upwardly against the action of the spring 22 until one or the other of the apertures are registered with the lens at which time the latter will enter the registering opening as b' to frictionally hold the diaphragm in its adjusted position.

What I claim is:

1. In an ophthalmoscope, the combination of a tubular head and a support therefor, a source of light on the support within the head, a projecting lens mounted on the outer end of the head, said head being adjustable axially relatively to the source of light to vary the distance between said source and projecting lens, releasable means for holding said head in its adjusted position, a diaphragm slide movable across the axis of the tubular head between the light source and lens, and means for maintaining a definite axial distance relation between the light-source and slide in all positions of axial adjustment of the tubular head relatively to its support.

2. In an ophthalmoscope, the combination of a lamp and a projecting lens arranged in axially spaced coaxial relation and relatively adjustable axially to vary the distance between the lamp and lens, means for holding the lamp and lens in their adjusted positions, a diaphragm movable across the space between the lamp and lens, and yielding means engaging the upper face of the diaphragm for maintaining a definite axial distance relation between the diaphragm and lamp in all positions of axial adjustment between the lamp and lens.

3. In an ophthalmoscope, the combination of a lamp and a projecting lens arranged in axially spaced coaxial relation and relatively adjustable axially, a diaphragm slidable across the axis of and between the lamp and lens, and means including a spring-pressed bearing ring engaging the upper face of the diaphragm for maintaining definite axial distance relation between the diaphragm and lamp in all positions of relative axial adjustment of the lamp and projecting lens.

4. In an ophthalmoscope, a lamp-element and a projecting lens-element arranged in axially spaced coaxial relation and relatively movable axially, a diaphragm element movable across the axis of and between the lamp element and projecting lens element, and means including a spring for urging the diaphragm element toward the lamp element in all positions of relative axial movement of the lamp and lens.

5. In an ophthalmoscope, a lamp-element and a projecting lens-element arranged in axially spaced coaxial relation and relatively movable axially, a diaphragm element movable across the axis of and between the lamp element, a condenser lens between the lamp and the first lens element, and means including a spring for yieldingly holding the diaphragm and condenser lens in definite axial relation to each other and to the lamp in all positions of relative axial movement of the lamp and first lens element.

6. In an optical instrument of the character described, a lamp-supporting spindle, a lamp secured to the upper end of the spindle coaxial therewith against relative axial movement, a tubular head adjustable lengthwise of and upon said spindle and extending above the lamp, a projecting lens mounted upon the outer end of the head coaxial therewith and in axially spaced relation to the lamp to move axially with the head, releasable means for holding the head in its adjusted position, and means including a spring for urging the head outwardly when the holding means is released to increase the axial distance between the lamp and lens.

7. In an optical instrument of the character described, a lamp-supporting spindle, a lamp mounted on the spindle coaxial therewith, a tubular head adjustable lengthwise of and upon said spindle, a projecting lens mounted upon the outer end of the head coaxial therewith and in axially spaced relation to the lamp, releasable means for holding the head in its adjusted position, a diaphragm movable across the axis of the head, and means including a spring for urging the diaphragm and tubular head in opposite directions.

8. In an optical instrument of the character described, a lamp-supporting spindle, a lamp secured to the outer end of the spindle against relative axial movement, a condenser lens mounted on the spindle, in the path of the light-rays of the lamp, a head adjustable lengthwise of and upon the spindle, releasable means for holding the head in its adjusted position, a projector lens mounted on the outer end of the head coaxial with and in axially spaced relation to the condenser lens, a diaphragm slidable across the outer face of the condenser lens, and means including a spring between the diaphragm and projecting lens normally urging the diaphragm and head in opposite directions.

9. In an ophthalmoscope having a lamp and a condenser lens arranged in coaxial axially spaced relation, said lens having a convex outer face, and a diaphragm slidable across and against said convex face and provided with a series of apertures for successively registering with the lens, the ends of the aperture adjacent the lens being enlarged to receive the convex side of the lens when registered therewith to frictionally hold the diaphragm in its different positions of adjustment, and means including a spring for urging the diaphragm toward the lens.

10. An ophthalmoscope comprising a lamp holder, a lamp on the outer end of the lamp holder coaxial therewith, a lens holder mounted on the lamp holder and extending beyond the lens, a lens mounted on the lens holder in axially spaced coaxial relation to the lamp, an additional lens holder adjustable axially of and upon the lamp holder and extending some distance beyond the first named lens holder and also adjustable angularly about the axis of the lamp holder, a projecting lens mounted on the outer end of the second lens holder in axially spaced coaxial relation to the first lens holder, releasable means for holding the second lens holder in its adjusted positions, a diaphragm movable across the axis of and between the lenses and provided with a series of apertures adapted to be brought into registration with said axis as the diaphragm is moved from one position to another, and means including a spring-actuated bearing ring engaging the upper surface of the diaphragm for maintaining definite axial relation between the diaphragm and first named lens as the second lens holder is adjusted axially to different positions.

11. In an ophthalmoscope, the combination with a lamp-supporting spindle, a lamp secured to the outer end of the spindle, a tubular head mounted upon the spindle and extended axially beyond the lamp, a light-projecting medium mounted in the outer end of the head and arranged to project the light rays of the lamp forwardly, and a diaphragm slidable transversely of the axis of the head between the lamp and said light projecting medium and provided with a plurality of apertures having their inner and outer ends enlarged.

12. In an ophthalmoscope, a lamp-supporting spindle, a lamp on the outer end of the spindle, a tubular head slidable on the spindle and extended beyond the lamp, and a projecting lens mounted on the outer end of the head, in combination with an apertured diaphragm slidable across the outer end of said spindle between the lamp and lens, and a split spring band embracing a portion of the periphery of the head and provided with means for frictionally engaging the diaphragm to hold the latter in its adjusted position.

WILLIAM N. ALLYN.